Sept. 21, 1937.   J. EGGERT ET AL   2,093,655
PHOTOGRAPHIC THREE-COLOR PROCESS
Filed Nov. 16, 1934
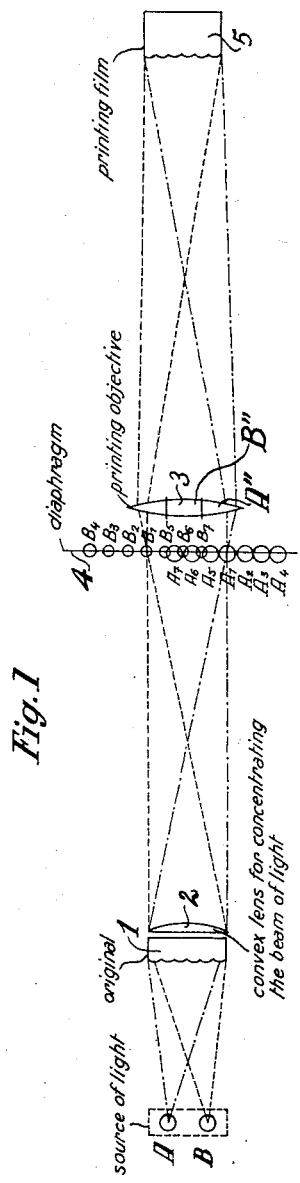
Inventors:
John Eggert,
Gerd Heymer;
By Potter, Pierce & Scheffler,
Attorneys.

Patented Sept. 21, 1937

2,093,655

UNITED STATES PATENT OFFICE 2,093,655

PHOTOGRAPHIC THREE-COLOR PROCESS

John Eggert, Leipzig-Gohlis, and Gerd Heymer, Wolfen Kreis Bitterfeld, Germany, assignors to I. G. Farbenindustrie Aktiengesellschaft, Frankfort-on-the-Main, Germany Application November 16, 1934, Serial No. 753,397
In Germany November 16, 1933

1 Claim. (Cl. 88—24)

Our present invention relates to a photographic three-color process.

In the application Ser. No. 608,829 filed May 2, 1932, and matured into Patent 1,968,944, Heymer one of the inventors of the present invention has described a process of producing three-color pictures by means of lenticular film on which two partial color pictures are recorded and a smooth film in contact with the lenticular film on which the third partial color picture is recorded.

It is an object of the present invention to provide a process for bringing the partial color pictures in a condition in which they are suited for reproduction. Another object is a process of this kind which is simple and efficient. Further objects will be seen from the detailed specification following hereafter. Reference is made to the accompanying drawing in which:

Fig. 1 represents printing of the two partial color pictures recorded on the lenticular film of a bi-pack on a lenticular film which is to receive three partial color pictures.

Fig. 2 shows an illuminating device for printing in the manner shown in Fig. 1, and Fig. 3 shows the interference images of the source of light as produced in printing.

According to the process of the present invention the partial color pictures recorded on the lenticular film and the partial color picture on the smooth film are directly printed on a lenticular film, that is to say without first printing the partial color pictures on the lenticular film on smooth film. First there are printed the partial color pictures on the lenticular film on another lenticular film so that they occupy only two thirds of the area of the emulsion layer behind each lenticular element. For this purpose the lenticular film bearing in its emulsion layer the two partial color pictures is illuminated by means of a source of light under separation of the colors and under the condition prevailing during exposure, for instance by means of a stepped diaphragm arranged at a distance from the film equal to that of the multi-color filter or its virtual image in exposure so that a line perpendicular to the lenticular elements of the film cuts only the aperture corresponding to one color strip of the multicolor filter. Directly over the emulsion layer of the film bearing the two partial color pictures there is placed a convex lens which projects a picture of the source of light on or near an objective which projects the original on the film to be printed on. In order to obtain the correct trace of the rays with relation to the printing film there is inserted in the trace of the rays at the place where the picture of the source of light is projected a stepped diaphragm provided with apertures which correspond as to their breadth with those of the projection filter or its virtual image. This diaphragm likewise underlies the condition that a line perpendicular to the lenticular elements cuts only an aperture corresponding with one color strip of the projection filter. The height of the apertures must be equal to the real image of that of the first diaphragm projected near the objective for obvious reasons. After having printed the two partial color pictures of the lenticular film on the lenticular printing film the partial color picture on the smooth film is printed on the lenticular printing film so that it occupies the remaining free third of the area of the emulsion layer behind each lenticular element. Such printing is well known for instance, from U. S. Patent 1,874,601 or French Patent 650,093 and need not therefore be described.

In Fig. 1 A and B are the wire coils of an incandescent lamp which as shown in Fig. 2 are arranged in the form of steps. These wire coils lie on a line parallel to the lenticular elements through the optical centers of the corresponding three-color filter, so that a line perpendicular to the lenticular elements cuts only one of the wire coils. The lenticular film 1 bearing the original is arranged in front of the source of light with its lenticular elements facing the source of light at a distance corresponding with that of the lenticular film from the multi-color filter or its virtual image in taking. Near the emulsion side of the original film remote from the source of light there is arranged the convex lens 2 which projects an image of the source of light on or near the printing objective 3 and simultaneously causes a concentration of the beam of light. In this plane there are formed images of the original by interference which overlie each other as illustrated by the letters $A_1$ to $A_7$ and $B_1$ to $B_7$ respectively. The diaphragm 4 inserted in this plane has apertures which as to breadth correspond with those of the projection filter. These apertures are arranged in step form as the wire coils of the source of light and have the same height, as the real images of the wire coils projected onto the objective or near the same. The two partial color pictures on the lenticular original film 1 are printed through the parts A″ and B″ of the printing objective 3 by masking the latter by the diaphragm 4 provided with corresponding apertures. The partial color picture on the smooth film is printed through a diaphragm having an aperture of the same breadth as each of the apertures of the diaphragm 4 and leaving unmasked that part of the objective 3 which had been masked in printing the two partial color pictures on the lenticular film of the bi-pack. The smooth film is arranged in such a manner that it is projected on the lenticular printing film by the objective 3. The printing objective serves to project the original on the printing film 5.

What we claim is:

A process of producing prints from three-color photographs taken on a pack consisting of a lenticular film on which two partial color pictures have been taken and a smooth film on which the remaining partial color picture has been taken, which comprises illuminating by means of a source of light the lenticular film bearing the original through the lenticular elements under separation of the colors and under the conditions prevailing in exposure, projecting a real image of the source of light on or near the printing objective by means of a convex lens which simultaneously concentrates the beam of light, inserting at the place where said real image is produced a diaphragm having three stepped apertures corresponding as to breadth with the breadth of the color strips of the projection filter and as to height with the height of the real images of the source of light projected on or near the printing objective, projecting the original on the printing film by means of a printing objective while masking one of the outer apertures of said diaphragm, thus printing the two color records of the lenticular film on two thirds of the emulsion layer behind each lenticular element of the printing film and then printing the color record of the smooth film on the remaining free third behind each lenticular element of the printing film through the aperture of said stepped diaphragm which had been covered in printing said lenticular film while masking the other two apertures.

JOHN EGGERT.
GERD HEYMER.